Patented Feb. 17, 1925.

1,526,413

UNITED STATES PATENT OFFICE.

HEINRICH CALLSEN, OF MUNICH, GERMANY, ASSIGNOR TO KALTSIEGELWERK G. M. B. H., OF STUTTGART, GERMANY, A CORPORATION OF GERMANY.

SEALING-WAX SUBSTITUTE.

No Drawing.    Application filed April 8, 1922.   Serial No. 550,361.

*To all whom it may concern:*

Be it known that I, HEINRICH CALLSEN, a citizen of Germany, residing at Munich, Germany, have invented certain new and useful Improvements in Sealing-Wax Substitutes, of which the following is a specification.

My invention refers to a substitute for sealing wax.

The use of ordinary sealing wax involves the disadvantage that a source of heat is required in order to bring the wax to a condition in which it can be used. Moreover sealing wax made in the present known form of sticks involves a considerable loss of material since a considerable quantity drops off during the heating and is not brought to the point where it is used. There is moreover the possibility of the user being burnt.

According to the present invention these objections are removed by providing a sealing wax substitute which can be used without heating, that is to say in the cold state, and nevertheless after hardening possesses all the properties of a wax seal produced in the hitherto known way.

According to the present invention the sealing wax substitute is of such composition that when cut off from the air it remains in a pasty or thickly fluid condition and is prevented from evaporating, whilst on exposure to the air the mass hardens.

If for example the pasty or thickly fluid mass is kept in a tube that can be closed, it is sufficient when a letter or the like is to be sealed to remove a small quantity of the paste from the tube and to press the seal on it; the wax substitute hardens in a short time in the air and not only acquires all the properties of a seal made with hitherto known sealing wax but has the advantage of a particularly strong hold upon the surface on which it rests, and increased flexibility.

The paste in its preferred form is made from a solution of celluloid as the principal ingredient with suitable additions.

I am aware that it is already known to employ as a wax substitute for sealing bottles a mass made from celluloid. In this case, however, a thinly flowing solution has been used which does not harden on exposure to the air and in which the bottles to be treated are dipped, so that the celluloid adheres to the head of the bottle in a very thin layer and a closure of the bottle is effected. The drying of this closure occupies a relatively long time and it requires to be kept in a well aired space at a high temperature. This known substance for closing bottles is therefore unsuitable for use as a sealing wax.

According to the present invention the substance for dissolving the celluloid preferable used in acetone. Instead of acetone, however, one may also employ ether, alcohol, amylacetate, benzine, benzol, chloroform, carbon disulphide, carbontetra-chloride and similar carbon compounds. Celluloid may be replaced by cellon.

If calcium chloride is used as an addition, this has the property of preventing the evaporation of the solvent of the celluloid.

Further constituents of the paste may be filling materials and coloring materials. As a filling material one could employ for example plaster of Paris which on exposure to the air assists the hardening of the paste, while the calcium chloride extracts a certain amount of water vapour from the air. Talcum or quartz may be substituted for or used in combination with plaster of Paris.

The coloring addition is a matter of taste and all kinds and shades of color may be employed.

A mass adapted for use as a sealing wax substitute according to the present invention is for instance obtained by dissolving 20 parts by weight of celluloid in 30 parts acetone and adding to the paste thus obtained 40 parts of plaster of Paris, 3 parts of calcium chloride and 5 parts of a suitable coloring matter. I may, however, also employ less celluloid and more of the filling bodies such as plaster of Paris.

I wish it to be understood that I do not desire to be limited to the exact details of composition and manufacture described as obvious modifications and suitable additions will readily present themselves to a person skilled in the art.

I claim:

As a new product, a substitute for sealing wax consisting of a pasty mixture of about 20 parts celluloid, 40 parts plaster of Paris, 3 parts calcium chloride and 30 parts acetone.

In testimony whereof, I affix my signature.

HEINRICH CALLSEN.